US008423965B2

(12) United States Patent
Goel et al.

(10) Patent No.: US 8,423,965 B2
(45) Date of Patent: Apr. 16, 2013

(54) TRACING OF DATA FLOW

(75) Inventors: Nitin K. Goel, Bothell, WA (US); Mark Wodrich, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 815 days.

(21) Appl. No.: 12/489,446

(22) Filed: Jun. 23, 2009

(65) Prior Publication Data

US 2010/0325359 A1 Dec. 23, 2010

(51) Int. Cl.
*G06F 9/44* (2006.01)
*G08B 23/00* (2006.01)

(52) U.S. Cl.
USPC ............................................. 717/126; 726/25

(58) Field of Classification Search ................... None
See application file for complete search history.

(56) References Cited

U.S. PATENT DOCUMENTS

| 7,047,521 | B2 | 5/2006 | Bunnell |  |
|---|---|---|---|---|
| 7,089,537 | B2 | 8/2006 | Das et al. |  |
| 7,155,708 | B2 | 12/2006 | Hammes et al. |  |
| 2006/0021054 | A1* | 1/2006 | Costa et al. | 726/25 |
| 2007/0006314 | A1* | 1/2007 | Costa et al. | 726/25 |
| 2007/0250820 | A1 | 10/2007 | Edwards et al. |  |
| 2008/0229286 | A1* | 9/2008 | Kahlon | 717/126 |

OTHER PUBLICATIONS

Chang, et al."Efficient and Extensible Security Enforcement Using Dynamic Data Flow Analysis", Retrieved at<<http://www.cs.utexas.edu/~lin/papers/ccs08.pdf>>, CCS'08, Oct. 27-31, 2008, Alexandria, Virginia, USA, pp. 12.

Cheng, et al."TaintTrace: Efficient Flow Tracing with Dynamic Binary Rewriting", Retrieved at<<http://ieeexplore.ieee.org/ielx5/11130/35645/01691114.pdf?isnumber=35645>>, Proceedings of the 11th IEEE Symposium on Computers and Communications (ISCC'06), 2006 IEEE, pp. 6.

"Quantitative Information-Flow Tracking for C and Related Languages", Retrieved at<<http://dspace.mitedu/bitstream/handle/1721.1/34892/MIT-CSAIL-TR-2006-076.pdf?sequence=1>>, Nov. 17, 2006, pp. 20.

Kalkusch, et al."Extending the Scene Graph with a Dataflow Visualization System", Retrieved at<<http://www.icg.tugraz.at/Members/kalkusch/pub/vrst2006_kalkusch_cashflow.pdf>>, VRST'06 Nov. 1-3, 2006, Limassol, Cyprus, pp. 9.

Reps, et al."Precise Interprocedural Dataflow Analysis via Graph Reachability", Retrieved at<<http://www.cs.cornell.edu/courses/cs711/2005fa/papers/rhs-popl95.pdf>>, pp. 1-13.

Chen, et al."From Speculation to Security: Practical and Efficient Information Flow Tracking Using Speculative Hardware", Retrieved at<<http://www.cs.ucsb.edu/~chong/papers/isca2008.pdf>>, pp. 12.

Newsome, et al."Dynamic Taint Analysis for Automatic Detection, Analysis, and Signature Generation of Exploits on Commodity Software", pp. 17.

* cited by examiner

*Primary Examiner* — Hyun Nam

(57) ABSTRACT

Embodiments for tracing dataflow for a computer program are described. The computer program includes machine instructions that are executable on a microprocessor. A decoding module can be configured to decode machine instructions obtained from a computer memory. In addition, a dataflow primitive engine can receive a decoded machine instruction from the decoding module and generate at least one dataflow primitive for the decoded machine instruction based on a dataflow primitive classification into which the decoded machine instruction are categorized by the dataflow primitive engine. A dataflow state table can be configured to track addressed data locations that are affected by dataflow. The dataflow primitives can be applied to the dataflow state table to update a dataflow status for the addressed data locations affected by the decoded machine instruction.

28 Claims, 5 Drawing Sheets

TRACING OF DATA FLOW

BACKGROUND

The ability to trace through the execution of individual instructions or follow a control flow in computer programs is valuable because tracing allows software developers to follow program logic in a step-wise manner in debugging mode. A tracing ability allows software developers to examine program states during the program's execution and solve logic and programming problems.

While the capability to trace the computer program's control flow and view program states has previously existed, tracing a dataflow within large computer programs has been a more difficult problem to address. Tracking dataflow or data propagation in a computer program is a harder problem than tracing a computer program's control flow because a dataflow tracing tool may interpret the dataflow or data propagation effects of a large number or even all of machine instructions the computer program executes. For example, tracking dataflow can include tracking the effect of dataflow on memory and registers modified by machine instructions. Typical modern programs execute several billion machine instructions in even the simplest runs. The combination of a large number of instructions and program states introduces a high level of complexity and performance issues for dataflow tracking. Therefore, tracking data propagation for large numbers of machine instructions can be computationally problematic and time consuming.

Tracking the propagation and influence of data for a computer program is desirable but existing tools do not provide sufficient dataflow tracking capabilities. An area of particular interest is tracking the dataflow of tainted data. Data received from untrusted sources (including a user) can be referred to as tainted data or tainted information.

Some dataflow tracking systems have been available in runtime environments or hardware configurations. However, existing runtime solutions that perform dynamic dataflow and data taint tracking have suffered from performance problems. The use of extensively instrumented code in a compiled program can impact the program's execution performance and slow performance up to 40 times as compared to un-instrumented execution speed. Specialized hardware has also been used for tracking tainted information. However, specialized chip hardware for dataflow tracking is expensive to design and manufacture.

For programs with large volumes of data as inputs, simply keeping track of which input bytes affect other bytes in a program state at any point in time may use more memory than is practically available on typical software development hardware.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. While certain disadvantages of prior technologies are noted above, the claimed subject matter is not to be limited to implementations that solve any or all of the noted disadvantages of the prior technologies.

Various embodiments are provided for tracing dataflow in a computer program stored on a computer memory. The computer program can include machine instructions that are executable on a microprocessor. An exemplary system can include a decoding module configured to decode machine instructions obtained from the computer memory. The machine instructions can be obtained directly from the memory or via the callback of an execution tracing system. A dataflow primitive engine may receive a decoded machine instruction from the decoding module and generate at least one dataflow primitive for the decoded machine instruction based on the dataflow primitive classification into which the decoded machine instruction is categorized. A dataflow state table can track memory locations affected by dataflow. The dataflow primitives can update a dataflow status for memory locations in the dataflow state table affected by the decoded machine instruction.

In an additional embodiment, a dataflow caching table is included to cache opcodes decoded for machine instructions by using the machine instruction's memory address as an index for cached opcodes. A single primitive or a group of primitives that have already been generated for the opcode can also be cached in the dataflow caching table. The caching of opcodes and primitives enables the re-use of primitives each time the same machine instruction is executed.

DETAILED DESCRIPTION

Figure 1:
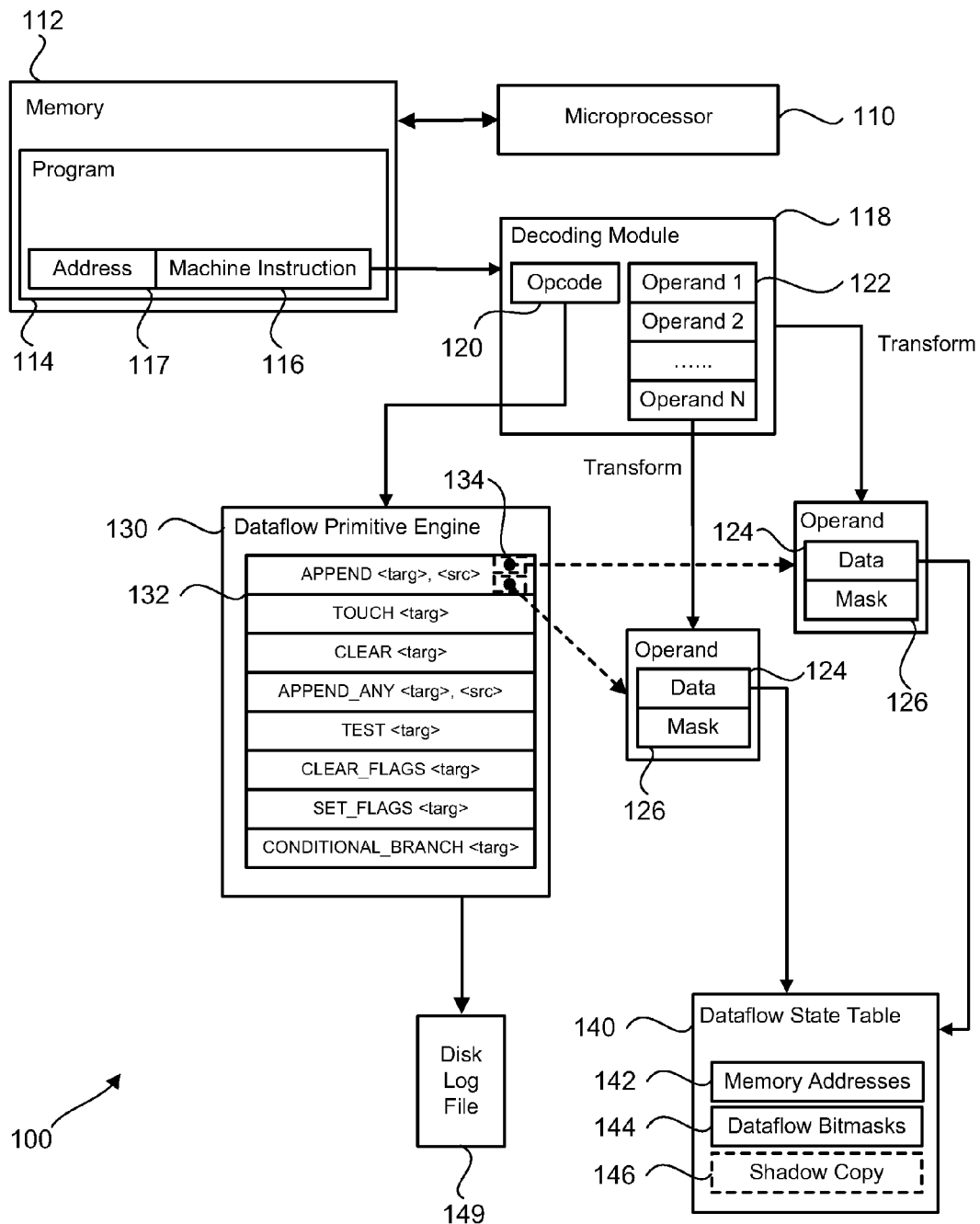
FIG. 1 is a block diagram illustrating an embodiment of a system for tracing dataflow for a computer program stored on a computer memory.

Reference will now be made to the exemplary embodiments illustrated in the drawings, and specific language will be used herein to describe the same. It will nevertheless be understood that no limitation of the scope of the technology is thereby intended. Alterations and further modifications of the features illustrated herein, and additional applications of the embodiments as illustrated herein, which would occur to one skilled in the relevant art and having possession of this disclosure, are to be considered within the scope of the description.

A particular reason why dataflow tracking and taint tracking for computer programs has become more important is because software security has become a serious technical, economic, and social problem. Software is constantly being attacked by malicious individuals via computer networks using a variety of methods. Some of these methods include providing malformed data to susceptible parts of a program. Examples of such attacks include: buffer overruns, format string attacks, high-level semantic attacks, or other similar problems. One feature of these types of attacks is that the tainted information is used to misdirect the normal control flow of the system and cause illegitimate or unintended uses of the supplied data.

One way to analyze the described attacks is to use automated operations to track the dataflow or data taint received from untrusted inputs by a computer program as the data is used by the program. "Dataflow" or dataflow propagation as discussed herein refers to tracking the movement of data and the effects of machine instructions and/or data upon other data in a computer memory for a computer program. Data taint tracking is a subset of dataflow tracking where a specific type of data, such as untrusted or corrupted data, is being tracked. Examples of untrusted data or inputs can include data from: incoming network ports, untrusted application program interfaces (APIs), file input and output (I/O), Remote Procedure Calls (RPCs), etc. An example of tracking general data is when the dataflow is tracked during a code walkthrough and the data propagation is viewed along with the execution of the code in the walkthrough.

In the past, the tracking of dataflow or taint was often performed by hand when a software developer viewed program states while reading source code or machine code. In contrast, automated dataflow tracking enables the tracking of dataflow or untrusted data as data flows through or is modified by an executing computer program in order to find out what underlying areas of the computer program are being affected or tainted as a result. The initial data of interest (e.g., tainted data, tracked data, debugging data, etc.) can be marked or selected as data for which dataflow may be tracked because a software developer is interested in the dataflow related to the selected data. In the example of tainted data, the software developer can mark certain data for tracking because the data is received from untrusted sources. Such tainted data can be tracked during debugging or program tracing playback in order to identify the uses and influences of the tainted data.

An initial overview of technology embodiments is provided below and then technology embodiments are described in further detail later. This initial summary is intended to aid readers in understanding the technology more quickly but is not intended to identify key features or essential features of the technology nor to limit the scope of the claimed subject matter.

Various embodiments are described for tracing dataflow for a computer program with machine instructions stored on a computer memory. An exemplary system can include a decoding module configured to decode machine instructions obtained from the computer memory. A dataflow primitive engine may receive a decoded machine instruction or opcode from the decoding module. The dataflow primitive engine can classify the decoded machine instruction into a dataflow primitive classification. Then the decoded machine instruction or opcode can be encoded into one or more dataflow primitives. In addition, dataflow primitives will be further explained below. An opcode may first be classified into a dataflow primitive classification in order to identify the type of dataflow operation that is applicable for the opcode and because more than one dataflow primitive may be generated for each opcode.

A dataflow state table can track memory locations affected by dataflow. The dataflow primitives generated by the dataflow primitive engine can be applied to the dataflow state table together with the operands, in order to represent the dataflow operations of the executing machine instructions on the memory locations stored in the dataflow state table.

A dataflow bitmask can be provided for each address location in the dataflow state table, and the dataflow bitmasks can be modified based on the dataflow operations applied by the dataflow primitives. In one embodiment, the dataflow primitives may set the bits of the dataflow bitmask to represent which bits of a memory location have been affected by dataflow. A reference to previously stored lookup and update code for each dataflow primitive may also be stored.

A dataflow caching table can be included to cache opcodes decoded for machine instructions by using the machine instruction's memory address as an index. One or more dataflow primitives that have already been generated for the opcode can also be cached in the dataflow caching table. The previously generated lookup and update code can also be cached for the dataflow primitives. The caching of opcodes and primitives enables the re-use of dataflow primitives when the same machine instruction is executed and provides efficient dataflow tracking.

FIG. 1 is a block diagram illustrating an embodiment of a system 100 for tracing dataflow for a computer program 114 stored on a computer memory 112. Examples of the computer memory that can be used for storing the computer program include: RAM (Random Access Memory which may include DRAM and DDR SDRAM), ROM (Read Only Memory), Flash memory, FPGA (Field Programmable Gate Array), and other types of readable computer memory. The computer program includes machine instructions 116 at a specific address 117 that are executable on a microprocessor 110 or other type of CPU (Central Processing Unit).

The system can include a decoding module 118 configured to decode machine instructions obtained from the computer memory as the computer program is executing. Every executed machine instruction may be examined by the decoder module. The first time a unique machine instruction is encountered, as determined by the machine instruction's memory address, the machine instruction can be decoded. The machine instructions in a binary representation can be decoded into opcodes 120 and the set of operands 122 for each opcode that are used by the microprocessor. An opcode or operation code is the portion of a machine language instruction that specifies the processor operation to be performed. In contrast, an operand specifies the data on which the operand can act (some operations may have implicit operands or no operands).

The decoding module can transform the operands of the machine instruction into a data field 124 and a mask field 126 representing the portion of the data field which cannot be changed (e.g., the mask field may use masking flags at a bitwise level) and cannot be operated on by the machine instruction. Portions of the data field that are masked and are not operated on by the machine instruction are not eligible to receive dataflow effects from other data (e.g., become tainted). In an embodiment, the mask field may use an inverted representation to represent which portions of the data field can be operated on. For example, mask field flags may be set for bits that will be operated on. Each machine instruction or opcode can include one or more operands 122, as illustrated. While FIG. 1 illustrates the use of two operands, the number of operands used by an opcode can vary from just one operand (possibly implicit) to multiple operands depending on the machine instruction being executed and the processor type on which the machine instruction is processed.

A dataflow primitive engine 130 can be configured to receive a decoded machine instruction from the decoding module and to categorize the decoded machine instruction or opcodes received from the decoding module 118 into one of a plurality of dataflow primitive classifications 132. The dataflow primitive engine can then generate at least one dataflow primitive for a machine instruction based on the dataflow primitive classification into which the decoded machine instruction is categorized.

The term "dataflow primitive" as used here is defined to include an operational instruction which is configured to track all or a portion of the dataflow effects of a machine instruction with respect to data being tracked for the computer program. In one specific embodiment, a dataflow primitive is configured to set dataflow tracking information in a data structure used for dataflow tracking (as discussed later). In contrast, an opcode defines what operations a microprocessor performs on address locations in the computer memory. There are a large number of machine instructions for a microprocessor or a computer chip (e.g., hundreds or even thousands) and each of these machine instructions may usually be classified into one of the several dataflow primitive types as exemplified in FIG. 1. The number of dataflow primitives that may be used for representing the dataflow transfer or taint transfer of the machine instructions can vary, and there may be up to 10 primitives or more if desired. However, the number of dataflow primitives used can generally model some or all of the dataflow (or taint flow) for the computer program.

The dataflow transfer accuracy may be higher or lower depending on the number and kind of primitives used in the dataflow primitive group. In other words, the dataflow primitives are used individually or in groups to represent the dataflow propagation of the original machine instructions in a computer program operating on a microprocessor. Often a group of two or more dataflow primitives may be used to represent the dataflow functions of a single machine instruction (e.g., opcode and operands). This dataflow primitive configuration allows a large number of different machine instructions to be represented by a small number of dataflow primitives, and this configuration can be compared to the way a few alphabet letters are used to form many words in a human language. While this description focuses on the tracking of dataflow generally, specific sub-categories of dataflow tracking include the tracking of tainted data or untrusted inputs. When the tracking of general dataflow is discussed herein, the tracking of tainted data and untrusted inputs are also encompassed.

A dataflow state table 140 can be configured to track dataflow that affects addressed memory locations. The dataflow primitives generated by the dataflow primitive engine 130 are used with the operands of the machine instructions and are used to update a dataflow status for the memory locations in the dataflow state table as affected by the decoded machine instruction. The dataflow state table can contain memory addresses 142 for memory locations and a dataflow bitmask 144 representing which bits of the memory location have been affected by the data tracking. In other words, the dataflow bitmask can represent the bits impacted by the dataflow or bits that have been tainted. The dataflow bitmask can be a binary mask that indicates whether the corresponding bit has been tainted or not, but the dataflow bitmask does not necessarily indicate how that bit was affected in this embodiment.

The term "memory location" as used here is defined to include general purpose memory and also faster specific-use memory locations such as registers and flags. Tracking registers and flags can enable data to be tracked where the tracked data begins in a register and affects other registers but does not affect the general purpose memory location. Tracking registers and flags can also be used to track dataflow when it originates from a memory location. For example, the initial dataflow state of a memory location may reflect that the memory location contains dataflow effects. When this memory location is read and the data value is stored in a register, then the register can be marked as having dataflow effects. If later the register value is stored in a different memory location, that memory location can be marked as having received dataflow effects from the register. Tracking the register used as an intermediary store enables accurate tracking of the dataflow from the source to destination memory locations. Table entries for registers or flags may also be provided as part of the dataflow state table, and the table entries provided for registers or flags can include a dataflow bitmask indicating which bits for each register or flag are affected by dataflow. In one embodiment, the table can be structured as a 2-level caching page table for efficiency.

Memory states, register states, and flag states may also be maintained on per-thread basis, per-function basis, per-module basis, or other computer program sub-division. This means the table may keep track of how many threads are in the trace or program being analyzed and the thread to which an instruction belongs. Additional dataflow state tables or sub-tables may be used to track register states or memory states on a per-thread basis.

The structure of the dataflow state table may vary depending on the desired implementation of the dataflow state table 140. In an optional embodiment, the dataflow state table may contain a shadow copy of the data 146 contained in the actual addressed memory location. Alternatively, the data contents of a memory location can be retrieved from the actual memory location in order to be displayed along with the dataflow state of that memory location when a user views the actual memory contents in a display grid of a graphical user interface (GUI). While the dataflow state table has been described here as a table, the dataflow state can also be stored in a relational database, an object oriented database, an XML (Extensible Markup Language) file, a flat file, or another data storage format.

One alternative table configuration can associate a memory location, register location, or flag with a set of input bytes that affected a specific entry in the dataflow state table representing the memory location, register location or flag. So, in addition to having a dataflow bitmask for a memory location affected by dataflow, input data affecting memory locations can be associated with or appended to one or more of the appropriate memory locations in the dataflow state table. This configuration enables the tracking of more fine grained information about which specific pieces of tracked data affected each memory location. Tracking the actual input values that affect memory and registers does not change the general operation of any of the dataflow primitives (as defined in Table A later). In this embodiment, the input data that affects a memory location may be stored or represented in the dataflow state table.

The dataflow state table initially contains memory locations that have been identified by a software developer as being inputs of interest or other data of interest. These identified inputs (e.g., memory locations) can be copied to the dataflow state table. Such inputs may include the identification of ranges of data that are untrusted or believed to be tainted. Alternatively, the identified inputs can be any selected data the users want to track, regardless of whether that data is trusted data, code walkthrough data, untrusted data, test data, or other selected data.

When data from tracked memory locations affects other memory locations for the executing program in such a way that the additional locations receive dataflow propagation effects, then the newly modified memory locations can be added to the dataflow state table. As an example, new memory locations that are not in the dataflow state table can interact with tainted memory locations and receive taint. In a similar manner, memory locations can be removed from the dataflow state table when the memory locations are cleared of dataflow effects by having data that is unrelated to the tracked data copied into the memory locations. Accordingly, cleared memory location entries can be removed from the data flow state table immediately. Of course, the cleared memory locations may be left in the state table for a longer period in anticipation that they might be impacted by the tracked dataflow again. One reason for keeping cleared memory locations in the state table for a predetermined time period is that once a memory location has been affected by the tracked dataflow there is a reasonable chance the memory location may be affected by the tracked dataflow again due to the looping nature of computer programs. In another embodiment, memory locations that are cleared of dataflow effects may be left in the table unless the dataflow state table exceeds a certain defined size threshold. If that size threshold is reached, then any cleared memory locations can be removed in a garbage collection fashion.

Using a dataflow state table 140 also enables multiple paths of dataflow propagation to be tracked at the same time. The use of dataflow primitives and a dataflow state table is not tied to a thread, register states, the stack state, or other types of program state indicators. Rather, the dataflow propagation is driven by dataflow primitives that are associated with individual machine instructions. Therefore, any number of dataflow paths can be tracked. The determination of which dataflow paths are tracked is simply dependent on the data that is copied to the dataflow state table. Data can be copied to the dataflow state table when tracking begins or at any time during the dataflow tracking process.

The dataflow can be propagated by using dataflow primitives that include defined functions to model the dataflow transfer of the actual machine instructions in the computer program while the computer program executes. For example, the dataflow primitive operations may include: a "clear" primitive, an "append" primitive for input bits that are not cross-affected by dataflow, an "append any" operation primitive for bits where the dataflow affects an entire output field, a "flag test and modification" primitive, and a "conditional branch" tracking primitive. These dataflow primitives apply dataflow propagation operations to the dataflow state table based on the machine instruction operations applied to the memory locations. This includes the operations that affect individual bits at a memory location, operations that affect all bits at a memory location, flag setting, and conditional branch operations.

A detailed example of the dataflow primitives and the primitives' operations will now be discussed. In one exemplary embodiment, machine instructions can be examined by the dataflow tracking system as the machine instruction is executed. If a machine instruction does not have any dataflow effect for the operands then the processing for that machine instruction may be skipped if desired or the instruction may be processed like other instructions. As mentioned before, the first time an instruction is encountered (as determined by instruction address) the system decodes the binary representation of the machine instruction into an opcode and a set of operands. Based on the opcode, a sequence of one or more of the following primitives is generated and the primitive group can have the same data propagation results as compared to the original machine instruction. In some embodiments, the data propagation results may only be similar to the data propagation effects of the original machine instructions as will be explained later. An example of a primitive set and their individual functions are listed below in Table A:

TABLE A

| Dataflow Primitive | Dataflow Operation |
| --- | --- |
| CLEAR <target> | The CLEAR dataflow primitive clears all the bits tracking dataflow in a dataflow bitmask for a <target> memory location in the dataflow state table. |
| TOUCH <target> | The TOUCH dataflow primitive does not affect the dataflow state table but may write a message to a log if any of the bits of target's dataflow bitmask (e.g., state) are set that the <target> was affected by dataflow. |
| APPEND <target>, <source> | The APPEND dataflow primitive copies dataflow bits from the dataflow bitmask of the <source> to the dataflow bitmask of the <target>. This may be performed using a bitwise OR between each of the same numbered bits pairs of the <target> and <source> dataflow bitmask. |
| APPEND_ANY <target>, <source> | The APPEND_ANY dataflow primitive checks the <source> dataflow bitmask in the dataflow state table to see if any bits are set to represent that the <source> memory address has been affected by dataflow. If the <source> memory address has been affected by dataflow, then the <target> dataflow bitmask in the dataflow state table will have every bit set to represent dataflow effects. |
| TEST <target> | The TEST dataflow primitive checks the <target> dataflow bitmask and if any of the bits of the <target> dataflow bitmask are set to represent that the <target> memory address has received dataflow effects, then a Boolean flag can be set that can later be checked by the SET_FLAGS primitive. |
| CLEAR_FLAGS <target> | The CLEAR_FLAGS primitive receives one or more <target> flag memory locations and clears the bit(s) in the dataflow bitmask associated with each flag memory location. |
| SET_FLAGS <target> | The SET_FLAGS primitive receives the <target> flag memory locations and sets the bits in the dataflow bitmaps of each of the flags |

TABLE A-continued

| Dataflow Primitive | Dataflow Operation |
|---|---|
| | received as an argument when tracked dataflow (e.g., taint) was discovered by the TEST primitive. If no dataflow effects are found, then each of the flags is cleared. |
| CONDITIONAL_BRANCH <target> | The CONDITIONAL_BRANCH primitive can record in the log that the given execution branch was executed based on a tracked flag or tracked value in a register if any of the bits of the target's dataflow bitmask are set. |

The sources and targets of these primitives can be represented as pointers to lookup and update code 134, which has pre-computed any pointers and dataflow bitmasks for accessing the relevant bits of registers, memory, flags, and data flow state for that operand. The lookup and update code is a block of code that may perform the pseudocode operations listed in Table B upon the dataflow state table. The lookup and update code can apply dataflow updates to the dataflow state table as defined by the operations of a dataflow primitive using the operands and updating the dataflow bitmasks.

An example of the operational effect of dataflow primitives on the dataflow state table and an output log is described in Table B below.

TABLE B

| PRIMITIVE | PSEUDOCODE |
|---|---|
| CLEAR <target> | CLEAR_ALL_BITS(target_dataflow) |
| TOUCH <target> | If NOT ARE_ALL_BITS_CLEAR(target_dataflow)<br># Record that the target was affected by dataflow |
| APPEND <target>, <source> | target_dataflow = BITWISE_OR (source_dataflow, target_dataflow) |
| APPEND_ANY <target>,<source> | if NOT ARE_ALL_BITS_CLEAR(source_dataflow)<br>SET_ALL_BITS(target_dataflow) |
| TEST <target> | If NOT ARE_ALL_BITS_CLEAR(target_dataflow)<br>SET(this_instruction_tested_some_dataflow_effect<br>) |
| CLEAR_FLAGS <flags> | For each flag in flags<br>CLEAR(flag) |
| SET_FLAGS <flags> | For each flag in flags<br>If<br>IS_SET(this_instruction_tested_some_dataflow_effect)<br>SET(flag)<br>Else<br>CLEAR(flag) |
| CONDITIONAL_BRANCH <flag> | If IS_SET(flag)<br># Record that the branch was affected by dataflow tracking |
| COPY <target>,<source> | A COPY dataflow primitive can be generated using the CLEAR <target> followed by an APPEND <target>, <source> dataflow primitive. |
| NOP | No dataflow operation results from the dataflow primitive. This is an optional instruction that may not be used if instructions with no dataflow effects are simply skipped. |

The reason these types of primitives are used is because the primitives provide a small set of distinct operations that can encode the data flow of the machine instructions being represented. While certain primitives have been discussed, there may be other small groups of primitives that provide a similar functionality or other different groups that provide equivalent functionality for the same set of machine instructions.

In an additional embodiment, the primitive operations can write the dataflow operations that affect input being traced to a disk log file 149. These primitives can have associated code that will write the operations as they occur to a log on a mass storage device such as a disk drive. In fact, some operations like the TOUCH operation may only write an entry to the log and may not make any changes to the dataflow state table. Then the log file can store the information needed to replay the dataflow and identify the input bits that affect certain output bits of program state at any point in time without needing to keep track of the dataflow information in memory at runtime.

As discussed before, the number of dataflow primitives that may be used for representing the dataflow propagation or taint transfer of the machine instructions can vary. The dataflow transfer accuracy may have varying levels of accuracy depending on the number and kind of primitives used in the dataflow primitive group. For example, if coarser grained dataflow tracking is desired, then just two primitives such as the CLEAR and APPEND_ANY primitives may be used. When a more fine grained level of tracking is desired, then all the primitives discussed may be used. For example, there may be situations where the data flow results of branching are not tracked and other situations where the dataflow results of branching are tracked. Alternatively, if a primitive is created that uses many parameters then just one or two primitives with parameter-dependent behavior may be used.

Figure 2:
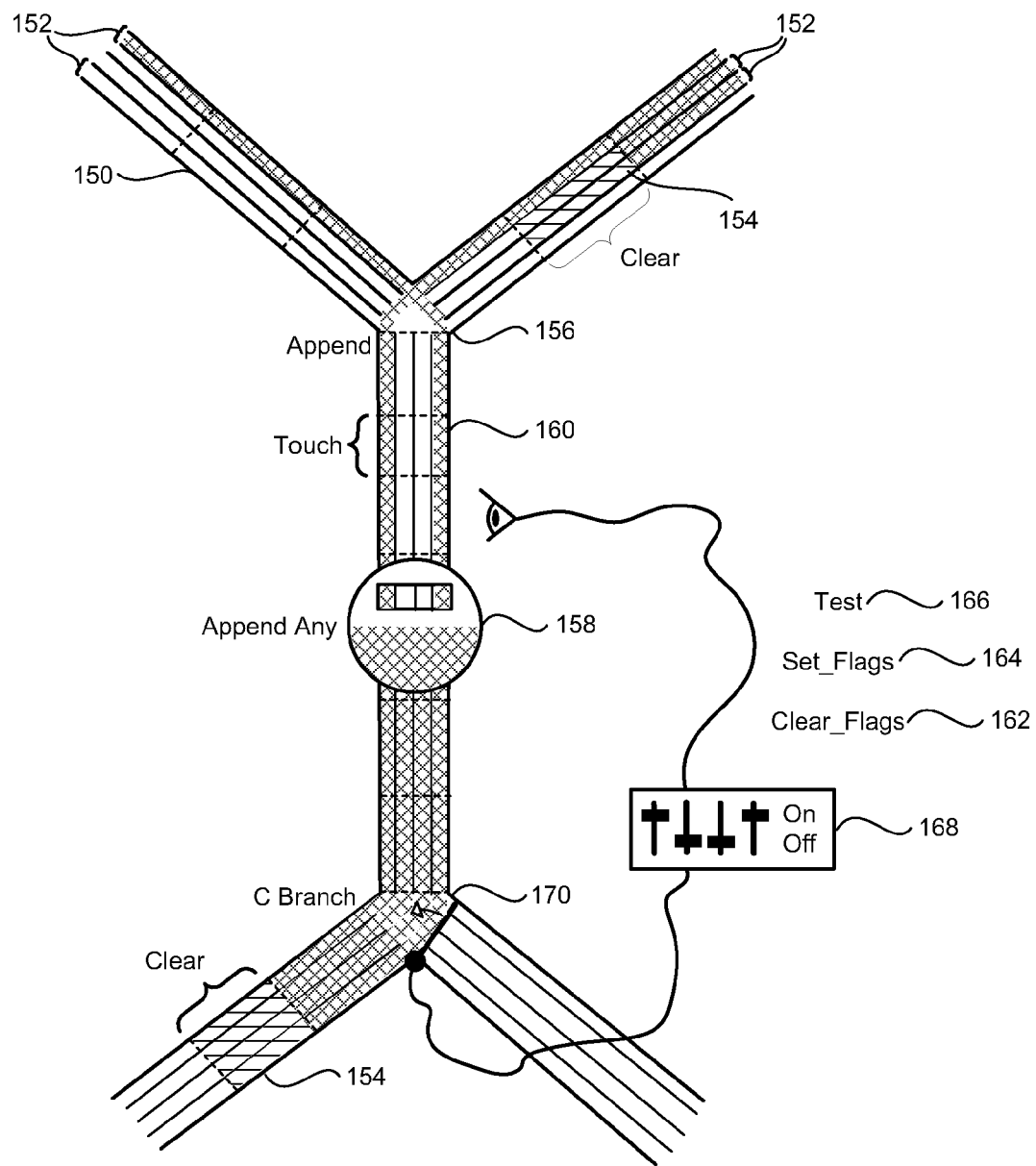
FIG. 2 is a chart illustrating a conceptual description for the transfer of data flow information using an embodiment of dataflow primitives as compared to channels containing fluid.

The operation of the dataflow primitives can be more clearly understood using the analogy of fluid flowing through a pipeline comprising channels and sub-channels, as illustrated in FIG. 2. A channel 150 represents memory locations that can hold data (e.g., registers and memory) which are subdivided into smaller constituent sub-channels or bits 152. Each section between two dotted lines represents an instruction operating on one or more sub-channels.

To trace the dataflow, the selected bits to be tracked are illustrated by cross-hatching at the locations in the pipeline opening. A system developer can mark the data locations of interest (e.g., bits or memory locations) with which to start dataflow tracing. From the initial starting point, the system can track dataflow movement by taking the actions in the cases described below.

The first dataflow tracking case is when a channel or sub-channel that has been affected by the tracked dataflow has the dataflow effects erased by the current machine instructions. For example, taint dataflow effects can be removed by the machine instruction. This change in state can be represented with the CLEAR primitive 154. The CLEAR primitive can use a dataflow bitmask on the dataflow state table for selected bits and clear those bits of dataflow effects. In addition, it is helpful to understand that unaffected memory locations cannot become affected by tracked dataflow unless the untracked data in memory comes into contact with data currently affected by the tracked dataflow. For instance, untainted data cannot become tainted unless it interacts with tainted data. Thus, a corresponding 'set' primitive for tracking flow during debugging may not be needed. However, the initially selected memory locations can be copied to the dataflow state table in response to instructions from a user or software developer, which initializes the dataflow state table with the selected data. Alternatively, selected data can be copied to the dataflow state table when any data inputs are received via a designated data channel (e.g. an untrusted channel, an untrusted API, an untrusted port, etc.)

Another dataflow tracking case is when tracked data gets mixed with other channels or sub-channels. Further, there are two subcategories of this case. The first sub-case is where the sub-channels are not cross-affected by the executing machine instruction and each bit of each input affects only its corresponding output bit. In this sub-case, the bit in each sub-channel becomes affected (e.g., tainted) if and only if at least one of its input sub-channels is affected. This case can be represented with the APPEND primitive 156 which can copy the tracked dataflow bits (or tainted dataflow bits) from the source memory location's dataflow bitmask to the same bits of the same significance in the target memory location's dataflow bitmask. For example, the most significant bit (MSB) from the source memory location's dataflow bitmask will have the dataflow state copied to the most significant bit (MSB) of the target memory location' bitmask. This process can continue down though to the least significant bit (LSB) until every bit representing dataflow tracking for the entire source memory location has been copied over to the target memory location's data flow bitmask. This can also be performed with a bitwise OR in some embodiments. In addition, there might be cases where only limited cross-mixing is possible. This situation can be represented as a series of APPEND primitives, one for every pair of sub-channels that gets affected by or mixed into the existing channel.

The second sub-case of tracked data being mixed with previously unaffected or untracked data is where the sub-channels are cross-mixed. In this case, if any of the input sub-channels are already affected then that dataflow tracking will spread to all of the output sub-channels. This situation can be modeled using the APPEND_ANY 158 operation.

In another use of the APPEND operation, an input location may completely replace what was previously in the output location, rather than adding to the data location. This can be modeled by first applying a CLEAR operation 154 to the data location and then an APPEND operation 156 of the input data to the data location. As a result, a separate 'copy' primitive is not needed. However, a copy primitive or a copy alias that represents the two primitives in the described group (i.e., CLEAR AND APPEND) may be used for code clarity, if desired.

Another dataflow tracking operation case is when a machine instruction is applied to tracked data even though no dataflow tracking is added or removed as a result. In this case, no additional memory locations are added to the state table and no bits in the dataflow bitmasks of existing memory locations are affected by dataflow. This can be modeled with the TOUCH primitive 160. The TOUCH primitive will not make any change to the dataflow state table, but the TOUCH operation may record the execution of the operation to a log file stored on a mass storage device such as a hard disk.

In certain machine instruction sets, not only can tracked data affect other data but tracked data can also control which machine instructions (i.e., branches) get executed due to conditional branching instructions. This can be represented in the fluid channel analogy as instruments that can flip a set of switches based on the tracked information, which can then be used to change the direction of flow later in the pipeline. In other words, the operations on tracked data can lead to affected processor flags which also need to be identified and tracked as being affected by the tracked dataflow. Processor flags are used herein to mean flags set by a microprocessor when certain processor states are generated by executing machine instructions on the microprocessor. These processor states can also be tracked by the described technology. For example, a processor flag can be set for an overflow state, carry state, parity bit state, or several other defined processor states that may occur.

A few more primitives are used to track these processor flags. A CLEAR FLAG primitive 162 can be used to reset individual switches or flags 168. Primitives are also needed for setting each flag if any sub-channel in a set of sub-channels contains tracked data. This flag set operation may be modeled with one primitive receiving a flag and a set of memory locations that affect the flag as argument parameters. However, to avoid using a variable number of parameters, the operation for setting flags can use two simpler primitives. The first primitive can test each location of interest using the TEST primitive 166. For example, the TEST primitive can do a bitwise OR between the bits in the dataflow bitmask to see if any of the bits are affected by dataflow. Then the second primitive can set the flags using the SET_FLAGS primitive 164 according to whether tracked dataflow (e.g., taint) was discovered by the TEST primitive.

An additional primitive operation can be provided to identify when execution flow is switched because a tracked flag has influenced the flow of operation. This is what the CONDITIONAL_BRANCH primitive 170 is provided to model. Specifically this branching primitive will record in the disk log that the given execution branch was executed based on a tracked flag or tracked value in a register.

Some machine instructions may not affect dataflow at all. An example of this is a "jump" instruction that simply branches to a specified address (e.g., jmp 0x12345678). As a result, an instruction may get encoded as a dataflow primitive that is a "no operation" (NOP) primitive. Alternatively, as mentioned before, some instructions that are known in advance to not affect the dataflow may be initially skipped and not even enter the dataflow tracking system or process.

Some examples of using primitives to encode the dataflow semantics of machine instructions are described in Table C below. The machine instruction examples in Table B are related to the Intel x86 instruction set, but these examples can be generalized to other instruction sets. Examples of types of instructions sets that may have primitives created for the instruction set include CISC and RISC instruction sets made by IBM, Motorola, DEC, Freescale, AMD, Intel, ARM, or any other computer chip development entity.

TABLE C

| INSTRUCTION | DATAFLOW PRIMITIVES |
|---|---|
| MOV EAX, 0x12345678 | CLEAR EAX |
| OR EAX, EBX | APPEND, EAX, EBX |
| | — |
| | CLEAR_FLAGS CO |
| | TEST EAX |
| | SET_FLAGS PZS |
| PUSH EAX | CLEAR [ESP] |
| | APPEND [ESP], EAX |
| SHL EAX, 1 | APPEND_ANY EAX, EAX |
| | — |
| | TEST EAX |
| | SET_FLAGS CZ |
| ADD EAX, EBX | APPEND_ANY EAX, EAX |
| | APPEND_ANY EAX, EBX |
| | — |
| | TEST EAX |
| | TEST EBX |
| | SET_FLAGS CPAZSO |
| XOR EAX, 0x12345678 | TOUCH EAX |
| | — |
| | CLEAR_FLAGS CO |
| | TEST EAX |
| | SET_FLAGS PZS |
| CMP EAX, 5 | TEST EAX |
| | SET_FLAGS CPAZSO |
| JNZ 0x12345678 | CBRANCH ZF |

In an alternative embodiment, the ability to track two or more different types of dataflow that exist in different sub-channels and/or at different locations is desirable. The dataflow primitives described above are sufficient to keep track of which dataflow types were present in each sub-channel at all times, as long as the appropriate dataflow state table structure and dataflow primitive modifications are provided. Another embodiment may provide a separate dataflow state table for different dataflow inputs that are being tracked.

Converting machine instructions into a set of primitives and program-state independent lookup and update operations that have the same data propagation semantics as the program itself can be beneficial for a number of reasons. One benefit is that the dataflow primitives can be more efficient to interpret than the extensive runtime instrumentation used for dataflow tracking in other systems. Another benefit is that the dataflow primitives are program state independent due to their granular nature and thus the overall program environment and/or program state does not need to be tracked with respect to dataflow.

The present technology also can track dataflow for an unmodified executable computer program. This enables legacy programs to be checked for dataflow issues or taint problems using the disclosed technology. Programs do not necessarily need to be recompiled or use special hardware to have their dataflow or tainted information tracked and analyzed.

Being able to reliably and economically trace individual pieces of data through a program enables the construction of several types of dataflow and taint analysis tools that might not otherwise be available. One example of a taint tracking tool improvement is a security tool that can reliably tell which executable code blocks are operating on data derived from untrusted inputs, even if the original inputs have been copied around in memory and manipulated multiple times. This level of analysis may also enable security efforts, such as code reviews, bug fixing, and compiler mitigations to be more tightly focused.

Another example of a new tool types that can be developed using the dataflow tracking technology discussed in this description include debugging tools or code walkthrough tools which can inform a user how a variable ended up with a particular value. In other words, the tool can tell the user where the value came from and which other code blocks previously operated on the stored value.

A performance profiling tool is another tool that can be improved by efficient and effective taint tracking. Specifically, a performance profiling tool with the enhanced dataflow tracking as described in this description is not limited to just reporting that memory location A was accessed N times and that memory location B was accessed M times. Such enhanced tools may report that memory location B was a copy of or derived from memory location A and therefore memory location A was indirectly accessed N+M times.

Figure 3:
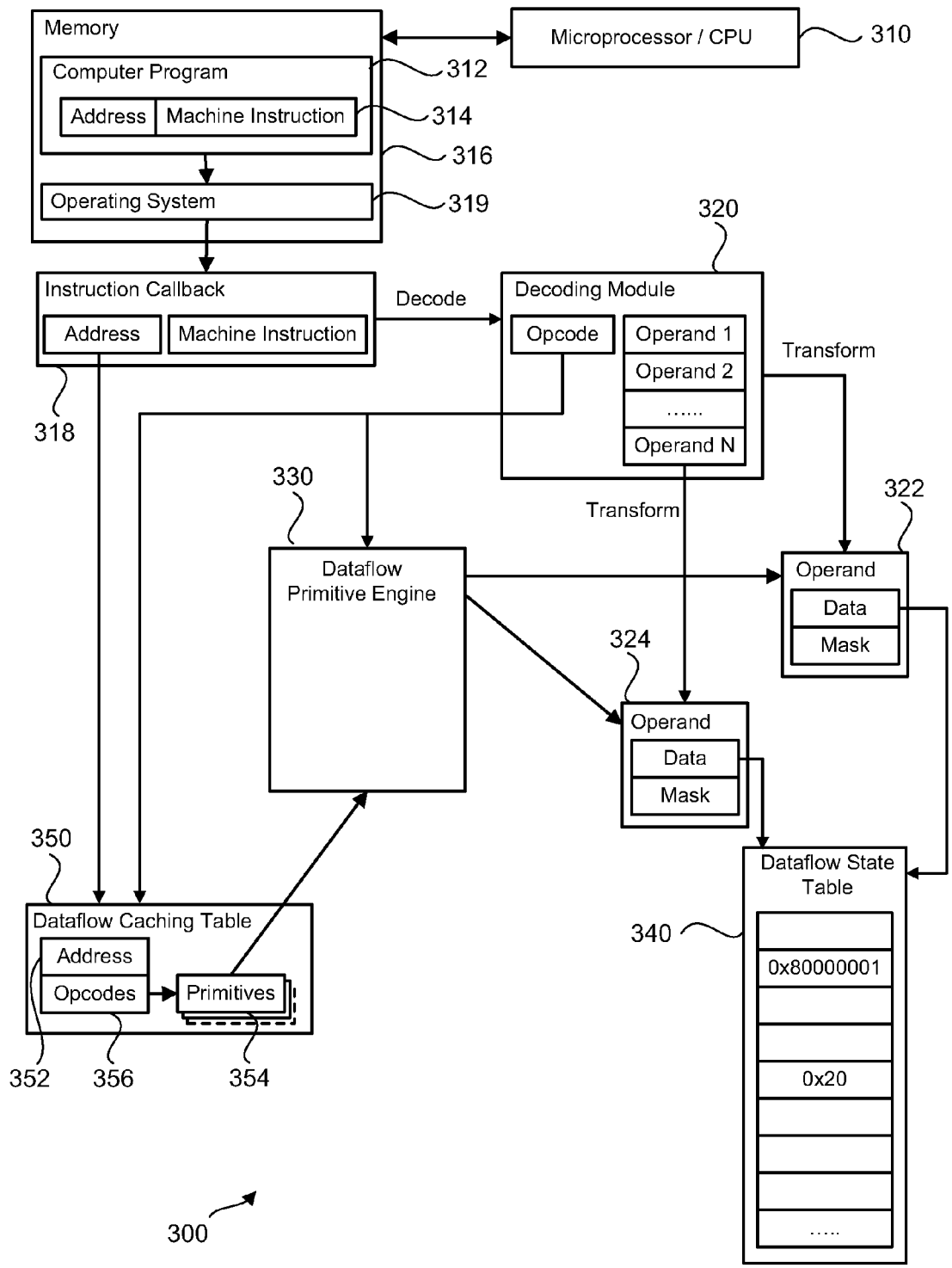
FIG. 3 is a block diagram of an embodiment of a system for tracing dataflow for a computer program using caching of the opcodes and dataflow primitives.

FIG. 3 is a block diagram illustrating an embodiment of a dataflow tracing system 300 for tracing dataflow in a computer program 312 stored on a computer memory 316. The computer program includes machine instructions that are executable on a microprocessor 310 (i.e., CPU). The embodiment uses a dataflow caching table and can receive the machine instructions 314 of the computer program for decompilation via an operating system 319 as supplied to a tracing and debugging platform or instruction callback module 318.

The instruction callback module 318 can be part of a debugging platform that allows a user to collect program traces while a program is being executed and then later re-execute or playback the same program execution from the saved trace file. Such program tracing platforms allow a user to debug and analyze applications offline through a trace file. The trace file also allows the tracing program to supply and/or reconstruct the machine instructions and address locations for the computer program. The instruction callback module can then supply machine instructions received from the program execution tracing application to the decoding module. An example of a tracing program as described is the iDNA program (Diagnostics Infrastructure using Nirvana Architecture) which has been developed by Microsoft Corporation. While an example embodiment of dataflow tracking systems using the technology described herein may use the iDNA time-travel-debugging platform, the disclosed technology can be used to perform dataflow tracing with any program tracing (e.g., debugging), replay system, emulation system, or even during real-time execution.

As discussed before, a decoding module 320 can be configured to decode the machine instructions. In this embodiment, the decoding module operates as described in FIG. 1. However, the machine instructions to be decoded into opcodes can be received from the computer program via an instruction callback module 318. The decoding module can transform the operands 322, 324 of the machine instruction into a data field and a mask field representing the portion of the data field that is operated on by the machine instruction.

A dataflow primitive engine 330 is configured to categorize the machine instructions (or opcodes) received from the decoding module 320 into one of a plurality of dataflow primitive classifications. The dataflow primitive engine can then generate one or more dataflow primitives for each machine instruction received.

The dataflow state table 340 can store addressed memory locations that are flagged and tracked at a bitwise level. The dataflow primitives use the operands of the machine instruction to update a dataflow status for the memory locations affected by the machine instruction.

In this embodiment, an example of a dataflow caching table 350 is configured to cache one or more levels of information. This avoids the repeated decoding of the opcodes from the machine instructions each time the machine instruction is executed. For a first caching level, the opcodes associated with each machine instruction can be stored by address. An opcode caching sub-table 356 can cache opcodes generated for machine instructions by instruction memory address 352. The opcodes may be received from the decoding module.

A second caching level may include the caching of data flow primitives generated for the opcodes. This caching can include the caching one or more primitive instructions that are associated with each machine instruction in a dataflow primitive sub-table 354. The dataflow primitives stored in the cache can be associated with and looked up by the instruction address 352 and/or the opcode 356. The dataflow primitive sub-table 354 is configured to cache grouped primitives that have already been generated for individual machine instructions in order to enable re-use of the grouped primitives on the dataflow state table each time the same machine instruction is executed. The caching of the primitives may include the caching of operand data fields, operand bit-masks, and pointers to lookup and/or update operations by instruction address, as desired. Blocks of lookup and update code can also be cached for later use when multiple instructions have identical operations and operands. Caching of the primitives and dataflow lookup and/or update operations by instruction address or opcode means the system will not need to recompute these operations when the dataflow tracking is executed again for the same instruction.

This caching system improves the overall speed of the dataflow tracking process by skipping the opcode decoding and primitive generation steps for machine instructions that have already been executed. Cached results can be retrieved from the cache instead of recalculated, thus avoiding unnecessary repetition of opcode decoding and primitive generating steps or operations. Subsequent executions of the same machine instruction can include calling the primitive's pre-computed lookup and update code (or handler address for the lookup and update code), which in turn calls the pre-computed lookup and update operations to track the data propagation of that instruction. The pre-computed lookup and update operations provide the executable code that looks up the appropriate memory addresses and dataflow bitmaps in the dataflow state table and applies the operations discussed to the dataflow state table, as exemplified in Table A and B. Representing dataflow state lookup and update operations with pre-computed operations aids in maximizing run-time efficiency. As previous attempts to track dataflow for a computer program have not converted instructions to a program-independent and state-independent representation, caching by instruction address would not have been possible. However, the described caching process can reduce the processing costs of dataflow tracing by up to 99% in some situations.

Figure 4:
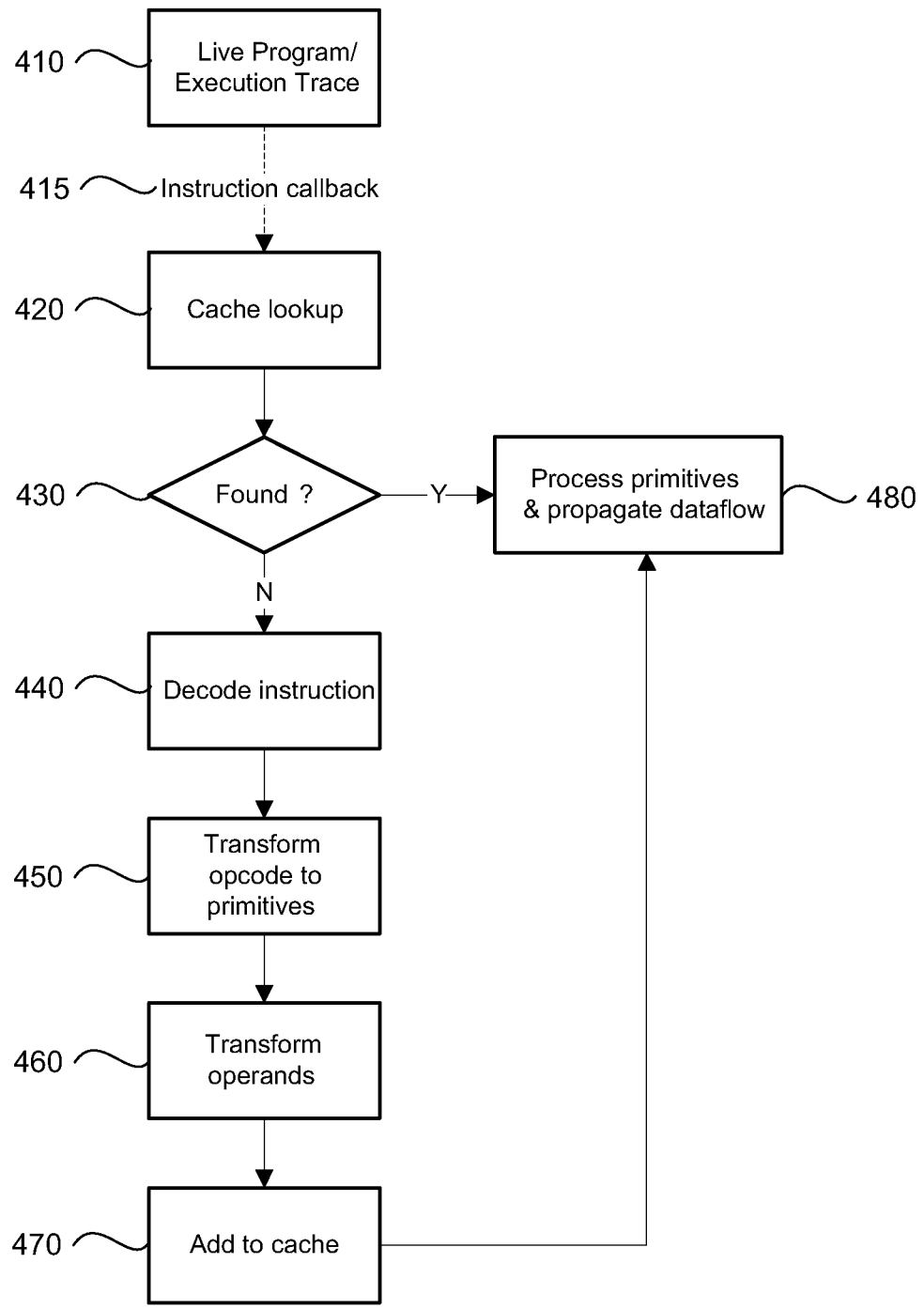
FIG. 4 is a flowchart illustrating an embodiment of a method for tracing dataflow for a computer program using caching of the opcodes and dataflow primitives.

FIG. 4 illustrates an embodiment of a method for tracing dataflow in a computer program using caching of the transformed opcodes and computed dataflow primitives. In an initial block 410, a live program will be executed or an execution trace will be started. As part of the setup for tracing dataflow, a software developer or user identifies the initial data that is desired to be tracked from a source such as: a buffer populated from network input, an API parameter, a problem data structure, or another identified application communication. In the case of security analysis, the data identified for tracking may be untrusted data or data that is believed to be tainted. The tracked data can be identified and stored in a dataflow state table while being tracked.

The instruction being currently executed by the computer program can be received by the dataflow tracking system via an instruction callback interface, as illustrated by item 415. The instruction call back interface will provide an instruction address and machine instruction to the decoding module and/or dataflow caching table. In block 420, the instruction address can be used to perform a cache lookup. In block 430, the dataflow tracking system that is performing the method of FIG. 4 will check to see if the instruction at the given address has been stored in the cache. If the instruction is found in the cache, then the cached opcode and dataflow primitives can be used to propagate the dataflow in the dataflow state table, as in block 480.

In the case where no instruction has been found, then the instruction will be decoded in a decoder module, as in block 440. In addition, the opcode can be transformed into one or more dataflow primitives, as in block 450. The operands for the opcode can also be transformed into a format that is useful for applying to the dataflow state table, as in block 460. These transformed opcodes can then be added 470 to the cache table by an instruction address and/or opcode index along with the transformed operand information, lookup functions, and update functions.

Figure 5:
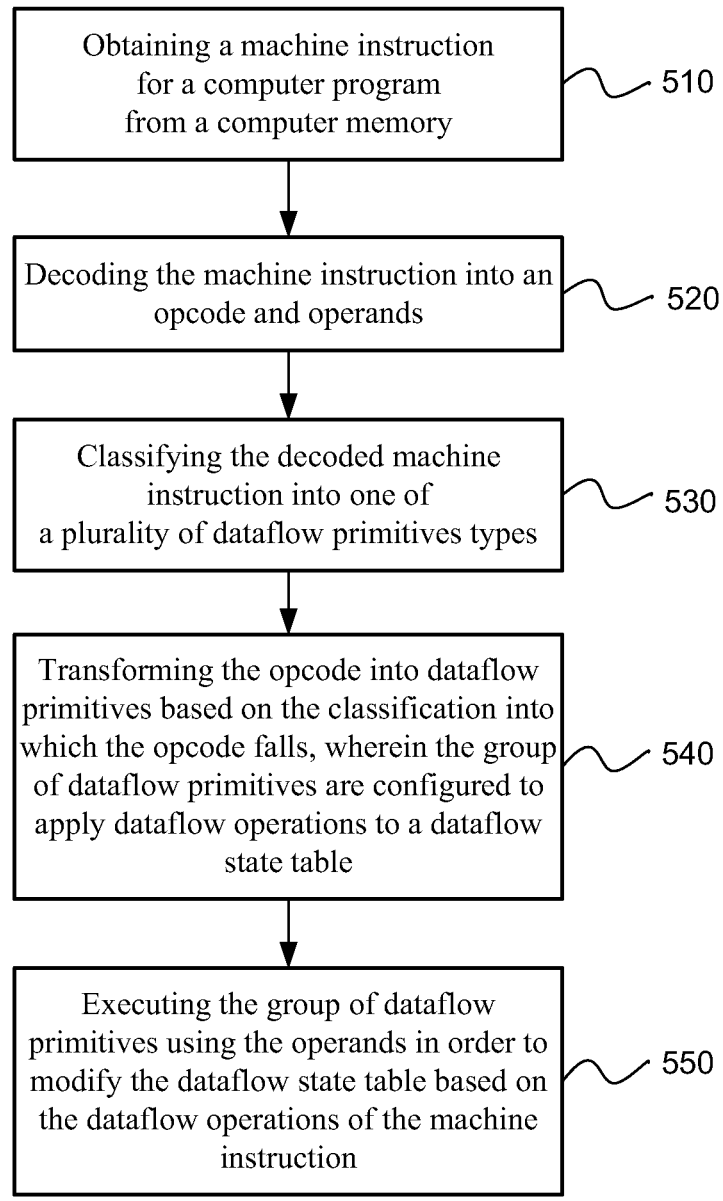
FIG. 5 is flowchart illustrating an embodiment of a method for tracing dataflow for a computer program.

FIG. 5 illustrates an embodiment of a method for tracing dataflow in a computer program. Initially, pre-determined inputs may be identified for a computer program by a software developer and information representing memory locations from the pre-determined inputs can be copied into the dataflow state table. The tracing method can include the operation of obtaining a machine instruction for a computer program from a computer memory, as in block 510. Alternatively, the machine instructions can be supplied by an instruction callback module or a debugging application to the instruction decoding module. The machine instruction can be decoded into an opcode and operands, as in block 520.

The decoded machine instruction is classified into one of a plurality of dataflow primitive types, as in block 530. In a further operation, the opcode is transformed into one or more dataflow primitives based on the dataflow primitive classification into which machine instruction was categorized, as in block 540. The operands can also be transformed into a data field and a data mask field representing the portion of the data field that is operated on by the opcode. The group of dataflow primitives can be executed using the operands in order to modify the dataflow state table based on the dataflow operations of the machine instruction, as in block 550.

The embodiments described above have been described as operating in a forward execution direction. However, the dataflow tracking embodiments and dataflow primitives described can also be used to track dataflow propagation or taint in a reverse execution direction. Program tracing tools and debuggers currently enable software developers to run their program backwards and watch their programs run in reverse. The dataflow primitives, decoder module, dataflow primitive engine, and dataflow state table may operate in a similar manner to their forward execution operation but these components can be modified to track dataflow and taint when running in reverse execution mode too. Regardless of which direction the dataflow is being tracked, the data output to the disk log and the data formats of the dataflow state table will be similar so that a software developer can read a similar format for dataflow tracking in both execution directions.

As an example of reverse dataflow tracking, a program may crash at a specific instruction address. This allows the software developer to tag the operands of the machine instruction and any related data fields that were being used when the program terminates abnormally as tainted (e.g., the last machine instruction crashed). Then the reverse execution can begin to track the dataflow from the last machine instruction executed during the program crash and then backwards to a breakpoint in the reverse execution or all the way back to the program's starting point.

In an alternative embodiment, all of the data in the source memory, registers, and flags are assumed to be of interest (or tainted) when a crash occurs. Then the reverse execution traces back from this data that was identified for tracking when the program crash occurred so that a software developer can see which untrusted inputs affected the dataset that was identified when the program crashed. After the reverse execution has taken place, the software developer can view the data locations stored in the dataflow state table to see which initial data memory locations or data inputs created problems for the crashed program.

Alternatively, the reverse execution can be started from a pre-determined point where the program's execution was stopped at a defined breakpoint while the program is operating normally. In this situation, the reverse execution will work backwards from the breakpoint using the dataflow primitives and the dataflow can be tracked using the dataflow information as identified by the software developer. In an example embodiment, this allows tainted information to be tracked backwards to identify bad input data that caused the tainted data.

To reiterate, dataflow tracking techniques are provided in this description, which make bit-level dataflow tracing of modern programs feasible. Some of the embodiments described include: (a) a dataflow primitive engine that converts machine instructions to a set of primitive operations that when combined can represent the data propagation semantics of a machine instruction, (b) a dataflow state table to track the dataflow for memory locations, (c) computing the lookup and update code and dataflow operations for each instruction operand, and (d) caching of opcodes and identified primitives so that instructions which are executed multiple times do not need to be re-processed.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

Furthermore, the described features, structures, or characteristics may be combined in any suitable manner in one or more embodiments. In the preceding description, numerous specific details were provided, such as examples of various configurations to provide a thorough understanding of embodiments of the invention. One skilled in the relevant art will recognize, however, that the invention can be practiced without one or more of the specific details, or with other methods, components, devices, etc. In other instances, well-known structures or operations are not shown or described in detail to avoid obscuring aspects of the invention.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

The invention claimed is:

1. A system for tracing dataflow in a computer program having machine instructions, the system comprising:
   a decoding module configured to decode an individual machine instruction of the computer program that is obtained from a computer memory, wherein the machine instructions of the computer program are processor-executable and the computer memory is configured to store the machine instructions;
   a dataflow primitive engine configured to receive the decoded individual machine instruction from the decoding module and to generate at least one dataflow primitive based on a dataflow primitive classification into which the decoded individual machine instruction is categorized by the dataflow primitive engine;
   a dataflow state table configured to track memory locations affected by the dataflow in the computer program, wherein the at least one dataflow primitive is applied to the dataflow state table to update a dataflow status for one or more individual memory locations affected by the decoded individual machine instruction; and
   one or more processors configured to execute at least one of the decoding module or the dataflow primitive engine.

2. The system as in claim 1, wherein the decoding module is further configured to transform one or more operands of the individual machine instruction into a data field and a mask field representing bits of the data field that are operated on by the individual machine instruction.

3. The system as in claim 1, further comprising a dataflow caching table configured to cache opcodes received from the decoding module for at least some of the machine instructions and to index the cached opcodes by memory address of the at least some of the machine instructions.

4. The system as in claim 1, further comprising a dataflow primitive sub-table configured to cache an already-decoded dataflow primitive for another individual machine instruction in order to enable re-use of the already-decoded dataflow primitive in an instance when the another individual machine instruction is executed again.

5. The system as in claim 1, further comprising an instruction callback module configured to supply, to the decoding module, the individual machine instruction in an instance when the individual machine instruction is recorded by a program execution tracing application.

6. The system as in claim 1, wherein the at least one dataflow primitive is selected from multiple dataflow primitives that apply dataflow propagation operations to the memory locations in the dataflow state table based on the machine instructions, the dataflow propagation operations including one or more first operations that affect all bits at an address, one or more second operations that affect individual bits at the address, one or more flag setting operations, and one or more conditional branch operations.

7. The system as in claim 1, wherein the at least one dataflow primitive is selected from multiple dataflow primitives that comprise a set of primitive operations which collectively represent taint propagation effects of the machine instructions for a microprocessor that executes the machine instructions.

8. The system as in claim 1, wherein the dataflow state table has a memory address for at least some of the memory locations affected by the dataflow in the computer program and a dataflow bitmask for memory location bits affected by the dataflow in the computer program.

9. The system as in claim 1, wherein the dataflow primitive engine is further configured to categorize the decoded individual machine instruction received from the decoding module into the dataflow primitive classification, wherein the dataflow primitive classification is selected from a plurality of dataflow primitive classifications.

10. A method for tracing dataflow in a computer program, the method comprising:
   obtaining a machine instruction of the computer program from a computer memory;
   decoding the machine instruction into an opcode and operands;
   classifying the opcode into an individual dataflow primitive classification from a plurality of dataflow primitive classifications;
   transforming the opcode into a group of dataflow primitives based at least in part on the individual dataflow primitive classification into which the opcode was classified, wherein the group of dataflow primitives is configured to apply dataflow operations to a dataflow state table representing memory locations, and the dataflow state table includes a memory location address, a dataflow bitmask and a copy of data for an individual memory location; and
   executing the group of dataflow primitives using the operands in order to modify the dataflow state table based on the dataflow operations.

11. The method as in claim 10, further comprising identifying untrusted inputs for the computer program and copying other individual memory locations from the untrusted inputs into the dataflow state table.

12. The method as in claim 10, further comprising caching the opcode by instruction address in a dataflow caching table.

13. The method as in claim 10, further comprising:
   caching previously-generated grouped dataflow primitives for other opcodes in a dataflow caching table; and
   re-using the cached previously-generated grouped dataflow primitives in instances when other machine instructions comprising the opcodes are executed.

14. The method as in claim 13, wherein the re-using further comprises looking up the previously-generated grouped dataflow primitives in the dataflow caching table.

15. The method as in claim 10, further comprising providing the machine instruction from the computer memory via an instruction callback module to an instruction decoding module that performs the decoding.

16. The method of claim 10, further comprising tracking propagated taint by using a plurality of dataflow primitives from which the group of dataflow primitives is selected, the plurality of dataflow primitives including: a clear primitive, an append primitive for input bits that are not cross-affected, an append any primitive for bits that affect an entire output field, a flag setting primitive, a flag clearing primitive, and a conditional branch tracking primitive.

17. The method as in claim 10, further comprising:
   adding additional memory locations to the dataflow state table when the additional memory locations are not previously contained in the dataflow state table and are affected by dataflow tracking; and
   removing other memory locations from the dataflow state table when the other memory locations are cleared of dataflow effects of the dataflow tracking.

18. A system for tracing dataflow, the system comprising:
   a decoding module configured to decode machine instructions obtained from a computer memory;
   a dataflow primitive engine configured to categorize a decoded individual machine instruction received from the decoding module into one of a plurality of dataflow primitive classifications and to generate at least one dataflow primitive for the decoded individual machine instruction based on the dataflow primitive classification into which the decoded individual machine instruction was categorized;
   a dataflow state table configured to track memory locations that are flagged as being affected by the dataflow, wherein the at least one dataflow primitive is applied to update a dataflow status for the memory locations that are flagged as being affected by the decoded individual machine instruction;
   a dataflow caching table configured to cache the at least one dataflow primitive generated by the dataflow primitive engine based on an instruction address; and
   one or more processors configured to execute at least one of the decoding module or the dataflow primitive engine.

19. The system as in claim 18, further comprising a dataflow primitive sub-table located in the dataflow caching table and configured to store previously-generated grouped primitives for other individual machine instructions and to enable re-use of the previously-generated grouped primitives in the dataflow state table in an instance when one of the other individual machine instructions is executed.

20. The system as in claim 18, wherein the plurality of dataflow primitive classifications correspond to: a clear primitive, an append primitive for input bits that are not cross-affected, an append any primitive for bits that affect an entire output field, a flag checking and setting primitive, and a conditional branch primitive.

21. A method comprising:
   obtaining an individual machine instruction from a computer program having a plurality of machine instructions stored on a computer memory, the plurality of machine instructions being processor-executable;
   decoding the individual machine instruction of the computer program to obtain an opcode and operands;

generating at least one dataflow primitive based on the opcode obtained by decoding the individual machine instruction; and tracking memory locations affected by dataflow of the computer program using a dataflow state table, wherein the tracking comprises applying the at least one dataflow primitive to the dataflow state table to update a dataflow status for one or more individual memory locations affected by the decoded individual machine instruction.

22. A system comprising:

one or more modules configured to:
- obtain an individual machine instruction of a computer program having a plurality of machine instructions, the plurality of machine instructions being processor-executable,
- decode the individual machine instruction of the computer program to obtain an opcode of the individual machine instruction,
- generate an instance of a dataflow primitive based on the opcode obtained by decoding the individual machine instruction,
- track memory locations affected by dataflow of the computer program using a dataflow state table, and
- apply the instance of the dataflow primitive to the dataflow state table and thereby update a dataflow status of one or more individual memory locations affected by the individual machine instruction; and one or more processors configured to execute the one or more modules.

23. A system comprising:

one or more hardware modules configured to perform the method of claim 21.

24. The system according to claim 22, wherein the one or more modules are further configured to:
- obtain another individual machine instruction of the computer program;
- decode the another individual machine instruction to obtain another opcode; and
- when the another opcode and the opcode are the same, generate another instance of the dataflow primitive and apply the another instance of the dataflow primitive to the dataflow state table and thereby update another dataflow status of one or more other individual memory locations that are affected by the another individual machine instruction.

25. The system according to claim 24, wherein the individual machine instruction and the another individual machine instruction are both x86 MOV instructions.

26. The system according to claim 25, wherein the instance and the another instance are both instances of a CLEAR dataflow primitive.

27. The system according to claim 22, wherein the one or more modules are further configured to generate multiple instances of different dataflow primitives for another individual machine instruction.

28. The system of claim 22, wherein the one or more modules are further configured to:
- store the instance of the dataflow primitive when the individual machine instruction is executed at a first time; and
- reuse the stored instance of the dataflow primitive in another update of the dataflow state table when the individual machine instruction is executed at a subsequent time.

* * * * *